(No Model.)
S. G. CABELL.
GAS GOVERNOR.
No. 479,553. Patented July 26, 1892.
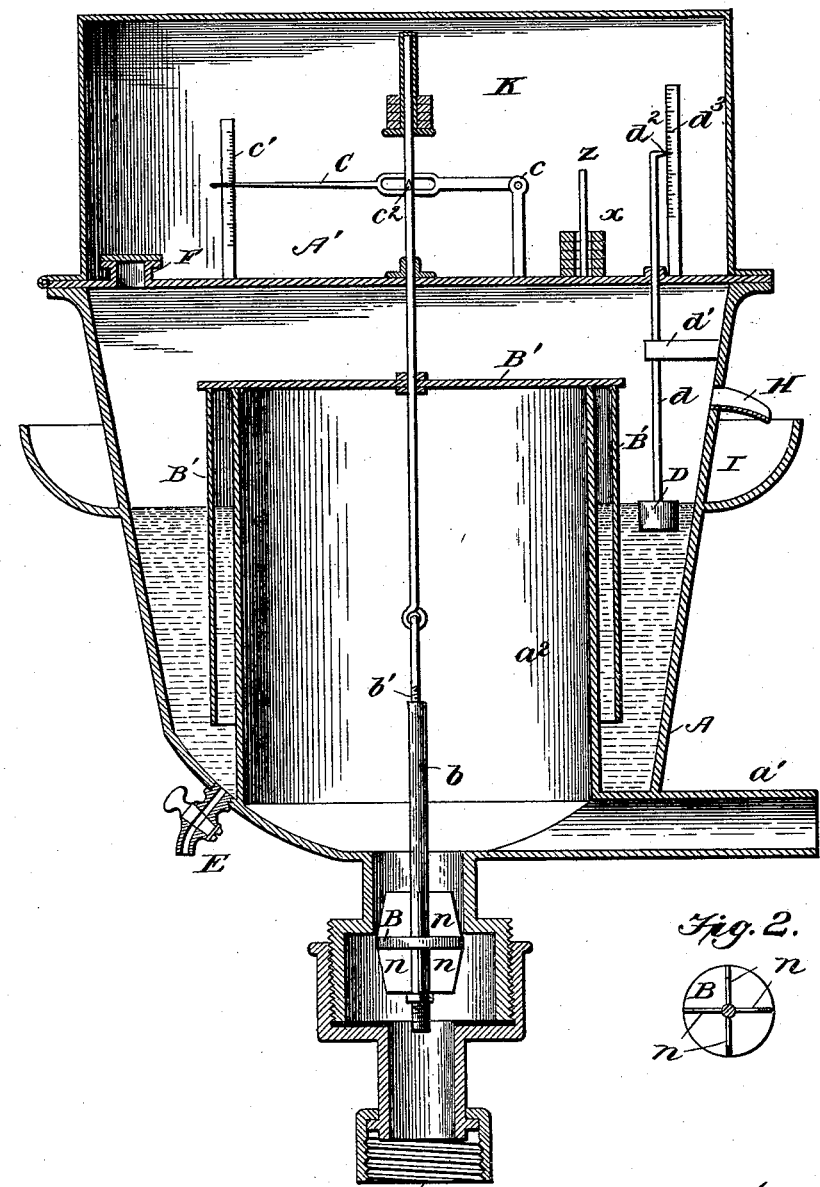
Witnesses
Edwin L. Bradford
D. B. Gallatin
Inventor
Samuel G. Cabell
By V. D. Stockbridge & Son
Attorneys

UNITED STATES PATENT OFFICE.

SAMUEL G. CABELL, OF WASHINGTON, DISTRICT OF COLUMBIA, ASSIGNOR, BY MESNE ASSIGNMENTS, TO THE QUINCY GAS ECONOMIZER COMPANY, OF QUINCY, ILLINOIS.

GAS-GOVERNOR.

SPECIFICATION forming part of Letters Patent No. 479,553, dated July 26, 1892.

Application filed February 11, 1892. Serial No. 421,206. (No model.)

*To all whom it may concern:*

Be it known that I, SAMUEL G. CABELL, a citizen of the United States, residing in the city of Washington, District of Columbia, have invented certain new and useful Improvements in Gas-Governors; and I do hereby declare that the following is a full, clear, and exact description of the invention, such as will enable others skilled in the art to which it appertains to make and use the same.

My invention relates to improvements in gas regulators or governors.

The object of a gas regulator or governor is to regulate the flow of gas under pressure to the distributing-pipes in a building in such way as to give a constant pressure at the burners whether one or many are in use at the same time, as well as to prevent pulsations through the distributing-pipes in cases of suddenly-varying pressures in the mains from which the distributing-pipes are supplied. In order that the main functions of a regulator may be carried out to the fullest extent, it is necessary that it be carefully adjusted when applied to use and further adjusted from time to time to the normal pressure in the mains.

The object of my invention is to secure the means for the most convenient and ready adjustment of the regulator, as well as to provide means for detecting at a glance the position of the valve, the amount of sealing liquid in the vessel, means for drawing off said liquid at will without disturbing the governor, and means for permitting the liquid to escape in case of accident, such as to tilt the vessel.

The invention consists in certain new combinations hereinafter described and claimed.

In the drawings, Figure 1 is a central section showing a gas-regulator with my improvements connected therewith. Fig. 2 is a detail showing the valve and a centering-wing therefor.

A is the main body or duct, through which gas is conducted to service. This vessel has an inlet-passage $a$, a discharge-passage $a'$, and an interior annular wall or partition $a^2$. The space between the annular and the outer wall constitutes the reservoir for the liquid seal.

B is the valve or cut-off, adjustably connected by means of rod $b$ with the inverted cup-shaped counter-balance B' by means of of a screw connection (shown at $b'$.)

A' is the cover for the main body or duct to protect the contents and exclude dirt, &c. This cover is centrally perforated to serve as a guide for the rod $b$, which projects through it. The rod serves as a support for light weights required for adjusting the weight of the valve, and also serves as a means of operating a pointer C, pivoted at $c$, as shown, the pointer being arranged adjacent to a graduated scale $c'$, supported on the cover A'. The pointer-arm is slotted, as shown, and the rod $b$ is provided with a cross-bar $c^2$, upon which the pointer rests. Through this means the pointer will indicate to the eye the exact position of the valve B, and therethrough the dimensions of the opening through the governor at any time.

D is a cork or float carrying a stem $d$, which extends upward through a guide-bracket $d'$ and out through the cover. The stem $d$ carries a pointer $d^2$, arranged opposite a graduated scale $d^3$, and shows at a glance the height of the sealing liquid in the reservoir.

E is a petcock for drawing off the sealing liquid as occasion may require. By reason of the petcock and the float and indicator the sealing liquid may be drawn off and replaced without removing the cover or otherwise disturbing the vessel after it has been adjusted in place, a capped filling-opening being provided, as shown at F.

H is one of a series of overflow-lips arranged around the main vessel to permit the liquid to escape in case of accidental tilting of the vessel, so that the liquid may not in such case overflow into the interior of the governor and thence to the pipes. To prevent the overflow from spreading over the floor or carpet, I provide a trough or receptacle I.

Z is a stem projecting from the cover, over which a series of light counter-weights $x$ are placed in readiness for application to the stem $b$ of the valve.

In order that the valve may be withdrawn at any time with the counterbalancing part, I make the valve in the form of a plug, which just fits the interior of the neck of the main body, and to keep the valve centered and to facilitate its introduction I attach to its upper and lower surfaces a series of wings $n$, slightly tapered, as shown. The wings on the upper side of the valve are of such height that they are always within the walls of the neck when in use. The stem $b$ is jointed, as shown, so that there may be the freest possible movement of the parts.

K is a hood or dome adjustably secured to the top of the main body by any suitable means to inclose the indicators and other devices outside the cover $A'$.

Having now described my invention, what I claim is—

In a gas-regulator, the combination, with a main casing having a liquid-reservoir and inlet and outlet openings, of a counterbalancing hood, a plug-valve having an area less than that of the vertical passage, the valve being flexibly connected to the hood and having wings to guide it through the passage, so that it may be readily inserted to and withdrawn from position through the top of the casing, and indicating devices connected to the valve for indicating the position of said valve relatively to its seat, substantially as described.

In testimony whereof I affix my signature in the presence of two witnesses.

SAMUEL G. CABELL.

Witnesses:
A. F. RANDALL,
EDWIN L. BRADFORD.